US011994680B2

(12) United States Patent
Cheng

(10) Patent No.: US 11,994,680 B2
(45) Date of Patent: May 28, 2024

(54) METHODS AND SYSTEMS FOR HIGH EFFICIENCY EYEPIECE IN AUGMENTED REALITY DEVICES

(71) Applicant: Magic Leap, Inc., Plantation, FL (US)

(72) Inventor: Hui-Chuan Cheng, Cooper City, FL (US)

(73) Assignee: Magic Leap, Inc., Plantation, FL (US)

( * ) Notice: Subject to any disclaimer, the term of this patent is extended or adjusted under 35 U.S.C. 154(b) by 555 days.

(21) Appl. No.: 17/332,373

(22) Filed: May 27, 2021

(65) Prior Publication Data

US 2021/0356748 A1  Nov. 18, 2021

Related U.S. Application Data

(63) Continuation of application No. PCT/US2019/063340, filed on Nov. 26, 2019.
(Continued)

(51) Int. Cl.
*G02B 27/01* (2006.01)
*F21V 8/00* (2006.01)
(Continued)

(52) U.S. Cl.
CPC ......... *G02B 27/0172* (2013.01); *G02B 5/122* (2013.01); *G02B 6/0023* (2013.01);
(Continued)

(58) Field of Classification Search
CPC .. G02B 27/0172; G02B 5/122; G02B 5/0023; G02B 5/0076
(Continued)

(56) References Cited

U.S. PATENT DOCUMENTS 5,418,584 A     5/1995  Larson
2017/0248790 A1*  8/2017  Cheng ............... G02B 27/0172
(Continued)

FOREIGN PATENT DOCUMENTS

AU    2018250534 A1    11/2018
CN       1847898 A    10/2006
(Continued)

OTHER PUBLICATIONS

Japanese Patent Application No. 2021-530892, "Office Action" and English translation, dated Jul. 11, 2023, 12 pages.
(Continued)

*Primary Examiner* — Jerry L Brooks
(74) *Attorney, Agent, or Firm* — KILPATRICK TOWNSEND & STOCKTON LLP

(57) ABSTRACT

A display system includes projection optics configured to project a beam of light in a first direction and an eyepiece unit including a first waveguide layer disposed in a first lateral plane and including an incident light surface and an opposing surface opposite the incident light surface and an incoupling diffractive optical element disposed on the incident light surface. The incoupling diffractive optical element is configured to incouple a first portion of the beam of light and to propagate the first portion of the beam of light by total internal reflection in a second direction and transmit a second portion of the beam of light along the first direction. The eyepiece also includes a retroreflector disposed adjacent the opposing surface. The retroreflector is configured to retroreflect the second portion of the beam of light along a reflected direction opposite to the first direction.

20 Claims, 11 Drawing Sheets

Related U.S. Application Data

(60) Provisional application No. 62/773,821, filed on Nov. 30, 2018.

(51) Int. Cl.
  *G02B 5/122* (2006.01)
  *G02B 5/18* (2006.01)
  *G02B 25/00* (2006.01)
  *G02B 27/00* (2006.01)

(52) U.S. Cl.
  CPC ......... *G02B 6/0076* (2013.01); *G02B 25/001* (2013.01); *G02B 27/0081* (2013.01); *G02B 2005/1804* (2013.01)

(58) Field of Classification Search
  USPC .......................................... 353/630
  See application file for complete search history.

(56) References Cited

U.S. PATENT DOCUMENTS

| | | |
|---|---|---|
| 2018/0101087 A1 | 4/2018 | Shinohara |
| 2018/0231771 A1 | 8/2018 | Schuck, III et al. |

FOREIGN PATENT DOCUMENTS

| | | |
|---|---|---|
| CN | 106662754 A | 5/2017 |
| CN | 107430283 A | 12/2017 |
| CN | 108139593 A | 6/2018 |
| JP | 07333413 A | 12/1995 |
| JP | 2000333098 A | 11/2000 |
| JP | 2004163858 A | 6/2004 |
| JP | 2015053163 A | 3/2015 |
| JP | 2015194551 A | 11/2015 |
| JP | 2018109745 A | 7/2018 |
| WO | 2010067114 A1 | 6/2010 |
| WO | 2017193012 A1 | 11/2017 |
| WO | 2020112836 A1 | 6/2020 |

OTHER PUBLICATIONS

Application No. EP19890305.6, Extended European Search Report, dated Dec. 22, 2021, 6 pages.
PCT/US2019/063340, "International Preliminary Report on Patentability", dated Jun. 10, 2021, 7 pages.
PCT/US2019/063340, "International Search Report and Written Opinion Received", dated Feb. 12, 2020, 8 pages.
Application No. CN201980078457.5 , "Office Action", dated Feb. 8, 2023, 6 pages. [no translation available].

* cited by examiner

METHODS AND SYSTEMS FOR HIGH EFFICIENCY EYEPIECE IN AUGMENTED REALITY DEVICES

CROSS-REFERENCES TO RELATED APPLICATIONS

This application is a continuation of International Patent Application No. PCT/US2019/063340, filed on Nov. 26, 2019, entitled "METHODS AND SYSTEMS FOR HIGH EFFICIENCY EYEPIECE IN AUGMENTED REALITY DEVICES," which claims the benefit of and priority to U.S. Provisional Patent Application No. 62/773,821, filed on Nov. 30, 2018, entitled "METHODS AND SYSTEMS FOR HIGH EFFICIENCY EYEPIECE IN AUGMENTED REALITY DEVICES," the disclosures of which are hereby incorporated by reference in their entirety for all purposes.

BACKGROUND OF THE INVENTION

Modern computing and display technologies have facilitated the development of systems for so-called "virtual reality" or "augmented reality" experiences, wherein digitally produced images or portions thereof are presented in a wearable device to a user in a manner wherein they seem to be, or may be perceived as, real. A virtual reality, or "VR," scenario typically involves presentation of digital or virtual image information without transparency to other actual real-world visual input; an augmented reality, or "AR," scenario typically involves presentation of digital or virtual image information as an augmentation to visualization of the actual world around the user.

Despite the progress made in these display technologies, there is a need in the art for improved methods and systems related to augmented reality systems, particularly, display systems.

SUMMARY OF THE INVENTION

The present disclosure relates generally to methods and systems related to projection display systems including wearable displays. More particularly, embodiments of the present disclosure provide methods and systems for eyepiece units that include a retroreflector that improves system brightness and performance. In a particular embodiment, the retroreflector is integrated with a waveguide layer of an eyepiece to recycle light and increase the effective coupling efficiency of projected light into the waveguide layer. The disclosure is applicable to a variety of applications in computer vision and image display systems.

According to an embodiment of the present invention, a display system is provided. The display system includes projection optics configured to project a beam of light in a first direction and an eyepiece unit including a first waveguide layer disposed in a first lateral plane and including an incident light surface and an opposing surface opposite the incident light surface and an incoupling diffractive optical element disposed on the incident light surface. The incoupling diffractive optical element is configured to incouple a first portion of the beam of light and to propagate the first portion of the beam of light by total internal reflection in a second direction and transmit a second portion of the beam of light along the first direction. The eyepiece unit also includes a retroreflector disposed adjacent the opposing surface. The retroreflector is configured to retroreflect the second portion of the beam of light along a reflected direction opposite to the first direction.

According to another embodiment of the present invention, an eyepiece unit is provided. The eyepiece unit includes a waveguide layer disposed in a lateral plane and including an incident light surface and an opposing surface opposite the incident light surface and a first incoupling diffractive optical element disposed on the incident light surface. The first incoupling diffractive optical element is configured to incouple a first portion of a beam of light propagating in a first direction and to propagate the first portion of the beam of light by total internal reflection in a second direction and transmit a second portion of the beam of light along the first direction. The eyepiece unit also includes a second incoupling diffractive optical element disposed on the opposing surface. The second incoupling diffractive optical element is configured to receive the second portion of the beam of light along the first direction, incouple a third portion of the beam of light and to propagate the third portion of the beam of light by total internal reflection in a third direction, and transmit a fourth portion of the beam of light along the first direction. The eyepiece unit further includes a retroreflector disposed adjacent the opposing surface. The retroreflector is configured to retroreflect the fourth portion of the beam of light along a reflected direction opposite to the first direction.

According to an specific embodiment of the present invention, a method of operating a display system is provided. The method includes directing a beam of light in a first direction, receiving the beam of light at an incident light surface of a waveguide layer having an opposing surface opposite the incident light surface, and propagating, at a first diffractive optical element, a first portion of the beam of light into the waveguide layer in a second direction. The method also includes transmitting, at the first diffractive optical element, a second portion of the beam of light toward the opposing surface and retroreflecting the second portion of the beam of light along a reflected direction opposite to the first direction.

Numerous benefits are achieved by way of the present invention over conventional techniques. For example, embodiments of the present invention provide methods and systems that can result in higher efficiency and can recycle light that would otherwise be lost by using a retroreflector. These and other embodiments of the invention along with many of its advantages and features are described in more detail in conjunction with the text below and attached figures.

DETAILED DESCRIPTION OF SPECIFIC EMBODIMENTS

Embodiments of the present invention relate to methods and systems utilizing projection display systems including wearable displays. More particularly, embodiments of the present disclosure provide methods and systems for eyepiece units fitted with retroreflectors. The disclosure is applicable to a variety of applications in computer vision and image display systems.

Figure 1:
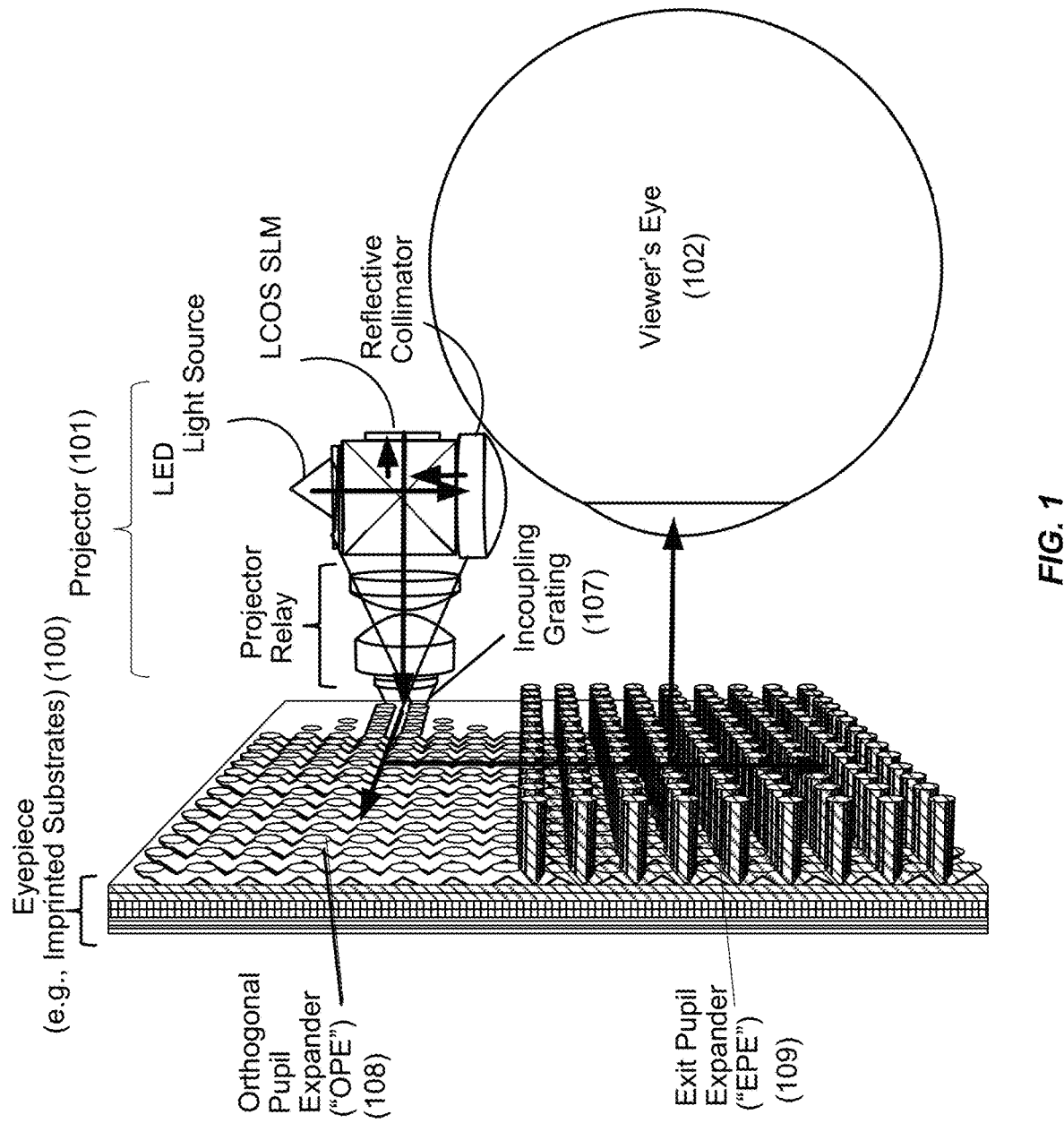
FIG. 1 illustrates schematically the light paths in a part of a viewing optics assembly (VOA) that may be used to present a digital or virtual image to a viewer, according to an embodiment of the present invention.

FIG. 1 schematically illustrates light paths in a viewing optics assembly (VOA) that may be used to present a digital or virtual image to a viewer, according to some embodiments. The VOA includes a projector 101 and an eyepiece 100 that may be worn around a viewer's eye 102. In some embodiments, the projector 101 may include a group of red LEDs, a group of green LEDs, and a group of blue LEDs. For example, the projector 101 may include two red LEDs, two green LEDs, and two blue LEDs. The eyepiece 100 may include one or more eyepiece layers. In some embodiments, the eyepiece 100 includes three eyepiece layers, one eyepiece layer for each of the three colors, red, green, and blue. In some embodiments, the eyepiece 100 may include six eyepiece layers, i.e., one set of eyepiece layers for each of the three colors configured for forming a virtual image at one depth plane, and another set of eyepiece layers for each of the three colors configured for forming a virtual image at another depth plane. In some embodiments, the eyepiece 100 may include three or more eyepiece layers for each of the three colors for three or more different depth planes. Each eyepiece layer includes a planar waveguide and may include an incoupling grating 107, an orthogonal pupil expander (OPE) region 108, and an exit pupil expander (EPE) region 109. Although the eyepiece layer is referred to as a planar waveguide layer herein, it will be appreciated that diffractive and/or reflective structures can be integrated together with one or more surfaces of the eyepiece layer, resulting in a waveguide layer that is generally planar, but characterized by non-planar regions at which light can be diffracted and/or reflected.

Still referring to FIG. 1, the projector 101 projects image light onto the incoupling grating 107 in an eyepiece layer 100. The incoupling grating 107 couples the image light from the projector 101 into a planar waveguide propagating the image light in a direction toward the OPE region 108. The planar waveguide propagates the image light in the horizontal direction by total internal reflection (TIR). The OPE region 108 of the eyepiece layer includes a diffractive element that couples and redirects a portion of the image light propagating in the waveguide toward the EPE region 109. The EPE region 109 includes a diffractive element that couples and directs a portion of the image light propagating in the planar waveguide in a direction approximately perpendicular to the plane of the eyepiece layer toward the viewer's eye 102. In this fashion, an image projected by the projector 101 may be viewed by the viewer's eye 102. The part of the VOA illustrated in FIG. 1 may constitute a "monocle" for one eye of the viewer. The entire VOA may include two such monocles, one for each eye of the viewer.

As described above, image light generated by the projector may include light in the three colors, blue (B), green (G), and red (R). Such image light can be separated into the constituent colors, so that image light in each constituent color may be coupled to a respective waveguide in the eyepiece.

Figure 2:
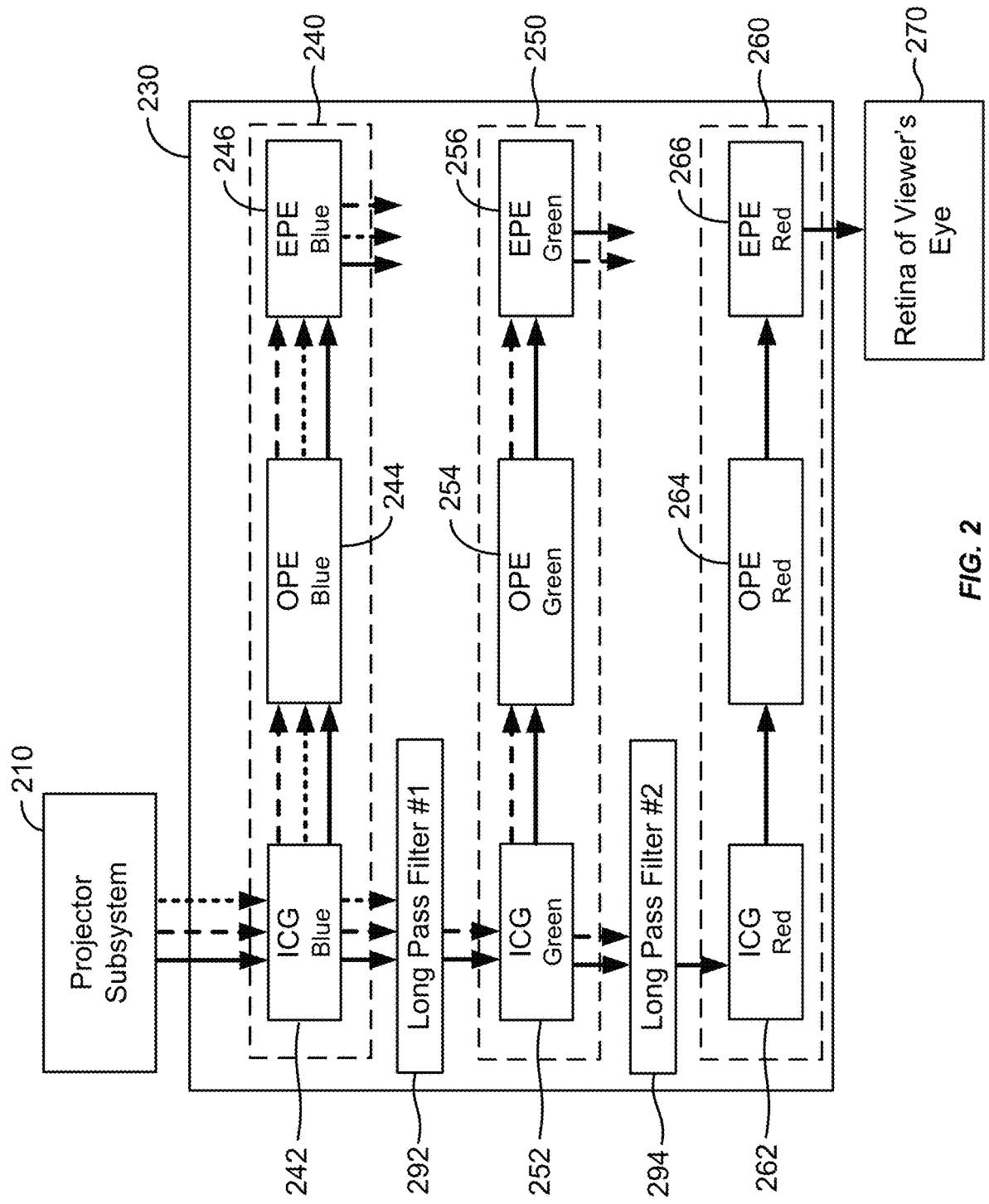
FIG. 2 illustrates schematically a method of color separation in an eyepiece for viewing a virtual image according to an embodiment of the present invention.

FIG. 2 illustrates schematically a method of color separation using an "in-line" approach according to an embodiment of the present invention. In this example, the eyepiece 230 may also include a blue waveguide 240, a green waveguide 250, and a red waveguide 260. Each waveguide 240, 250, or 260 may include an ICG 242, 252, or 262, an OPE region 244, 254, or 264, and a EPE region 246, 256, or 266. Here, image light in blue, green, and red colors generated by the projector subsystem 210 are not spatially separated from each other, and the ICGs 242, 252, and 262 in the blue, green, and red waveguides 240, 250, and 260 are laterally aligned with respect to each other. Thus, image light passes through each waveguide sequentially in a "serial" fashion. The eyepiece 230 may further include a first wavelength-selective optical element 292 positioned between the ICG 242 in the blue waveguide 240 and the ICG 252 in the green waveguide 250, and a second wavelength-selective optical element 294 positioned between the ICG 252 in the green waveguide 250 and the ICG 262 in the red waveguide 260. The first and second wavelength-selective optical elements 292 and 294 may, for instance, represent wavelength-selective optical filters (i.e., optical elements that selectively transmit light in a particular range of wavelengths) and/or wavelength-selective optical reflectors (i.e., mirrors and other optical elements that selectively reflect light in a particular range of wavelengths). A dichroic filter is one example of an optical element configured to both selectively transmit and reflect light on the basis of wavelength. In the following, the first and second wavelength-selective optical elements 292 and 294 may also be referred to as "optical filter 292" and "optical filter 294," respectively. Similarly, other wavelength-selective optical elements described with reference to any of FIGS. 3-9 may also be referred to herein as "optical filters."

As illustrated in FIG. 2, image light in all three colors is incident on the ICG 242 in the blue waveguide 240. The ICG 242 in the blue waveguide 240 may couple a portion of the image light primarily in the blue wavelength range into the blue waveguide 240 to be guided toward the OPE region 244. The ICG 242 in the blue waveguide 240 may also couple a small amount of green image light, and even a smaller amount of red light, into the blue waveguide 240, as will be discussed further. Image light that is not coupled into the blue waveguide 240 is transmitted through the blue waveguide 240 and incident on the first optical filter 292. The first optical filter 292 may be configured to have a high transmittance value in the green and red wavelength ranges, and a low transmittance value in the blue wavelength range. Therefore, image light transmitted by the first optical filter 292 and incident on the ICG 252 in the green waveguide 250 may contain primarily green image light and red image light, and very little or no blue image light.

Still referring to FIG. 2, the ICG 252 in the green waveguide 250 may couple a portion of the image light primarily in the green wavelength range into the green waveguide 250 to be guided toward the OPE region 254. The ICG 252 in the green waveguide 250 may also couple a small amount of red image light into the green waveguide 250, as will be discussed further later. Image light that is not coupled into the green waveguide 250 may be transmitted through the green waveguide 250 and incident on the second optical filter 294. The second optical filter 294 may be configured to have a high transmittance value in the red wavelength range, and a low transmittance value in the green and blue wavelength ranges. Therefore, image light transmitted by the second optical filter 294 and incident on the ICG 262 in the red waveguide 260 may contain primarily red image light, and very little or no green image light and blue image light. The ICG 262 in the red waveguide 260 may couple a portion of the image light primarily in the red wavelength range into the red waveguide 260 to be guided toward the OPE region 264.

Figure 3:
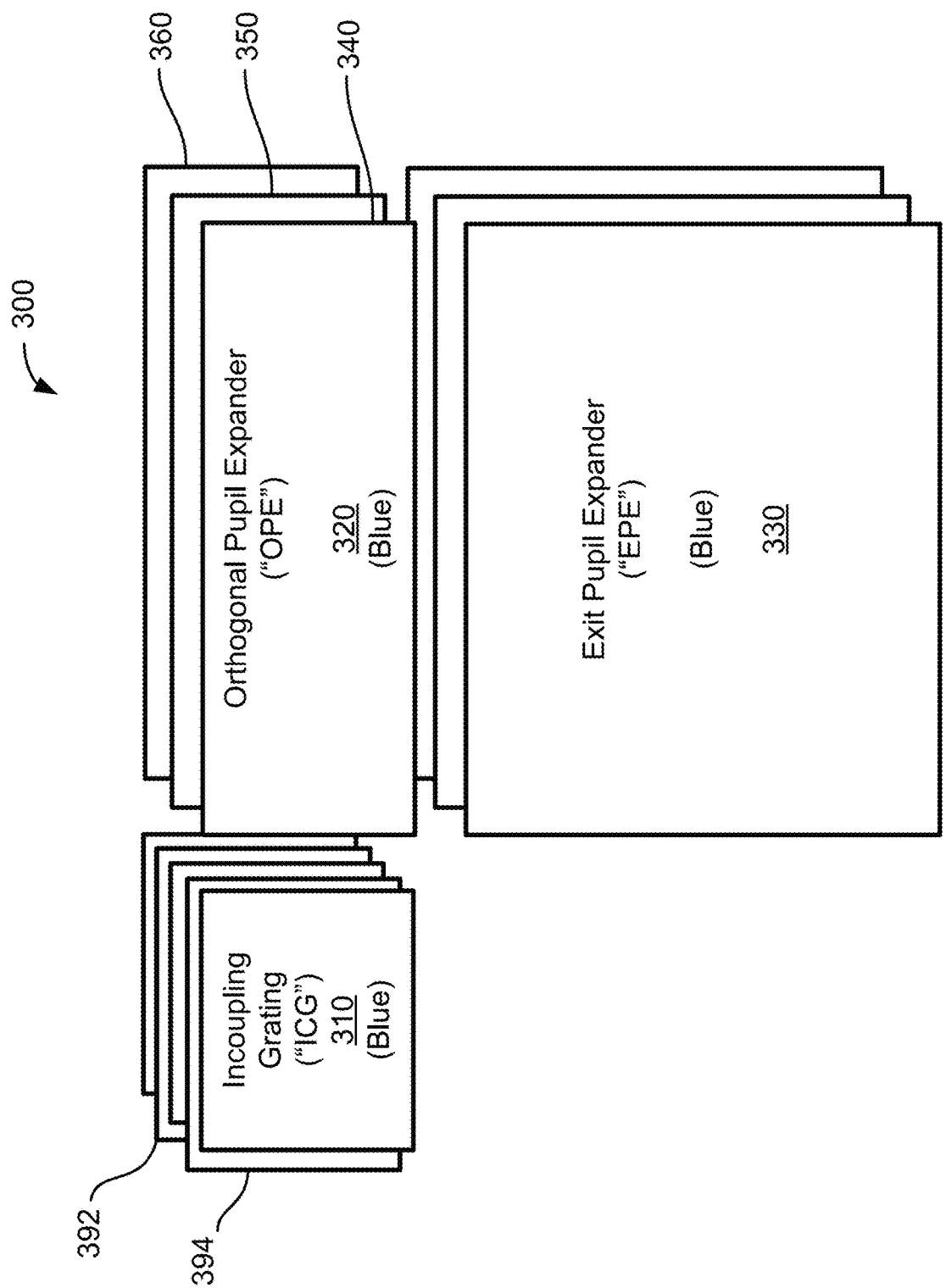
FIG. 3 illustrates schematically a plan view of an eyepiece according to an embodiment of the present invention.

FIG. 3 illustrates schematically a plan view of an eyepiece 300 according to an embodiment of the present invention. The eyepiece 300 may include a blue waveguide 340, a green waveguide 350, and a red waveguide 360 stacked in adjacent lateral planes. Each waveguide 340, 350, or 360 may include an ICG region 310, an OPE region 320, and a EPE region 330. The ICG regions 310 for the three waveguides 340, 350, and 360 may be disposed in the same lateral position, and are thus stacked along the same optical path. A first optical filter 392 may be positioned between the ICG 310 of the blue waveguide 340 and the ICG 310 of the green waveguide 350. A second optical filter 392 may be positioned between the ICG 310 of the green waveguide 350 and the ICG 310 of the red waveguide 360.

Figure 4:
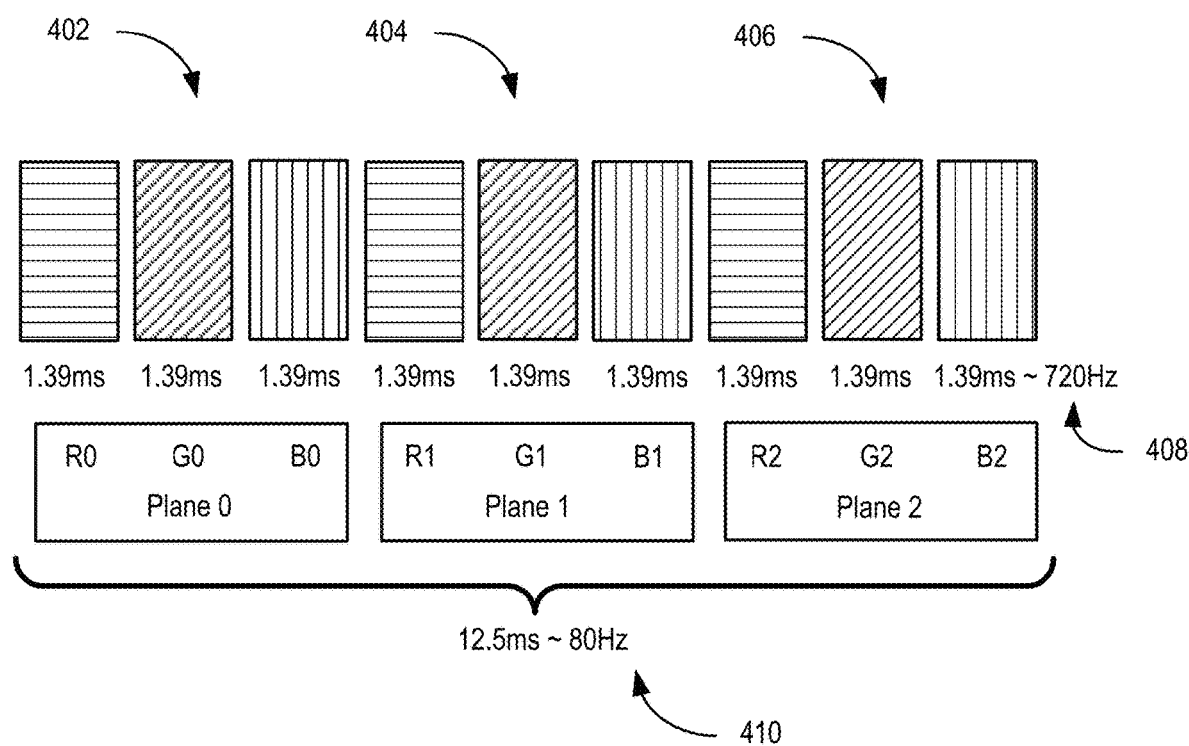
FIG. 4 is a schematic diagram illustrating time sequential encoding of colors for multiple depth planes according to an embodiment of the present invention.

FIG. 4 is a schematic diagram illustrating time sequential encoding of colors for multiple depth planes, according to some embodiments. As illustrated in FIG. 4, depth planes (three in this illustration) are encoded into the least significant bit (LSB) per pixel via a shader. The projector assembly discussed herein provides for precise placement of pixels for each color in a desired depth plane. Three colors are sequentially encoded for each depth plane—(R0, G0, B0 for plane 0) 402, (R1, G1, B1 for plane 1) 404, and (R2, G2, B2 for plane 2) 406. Illumination of each color for 1.39 ms provides an illumination frame rate 408 of 720 Hz and a frame rate for all three colors and three depth planes 410 of 80 Hz (based on 12.5 ms to refresh all colors and planes). In some embodiments, a single color for a single depth plane per frame may be used by only using light sources associated with that particular color for that particular depth plane.

In some embodiments, multiple depth planes can be implemented through the use of a variable focus lens that receives the sequentially coded colors. In these embodiments, there may be three eyepiece layers and the incoupling gratings may be spaced further apart such that incoupling gratings are not positioned directly across from one another about the optical axis. One of ordinary skill in the art would recognize many variations, modifications, and alternatives.

Figure 5:
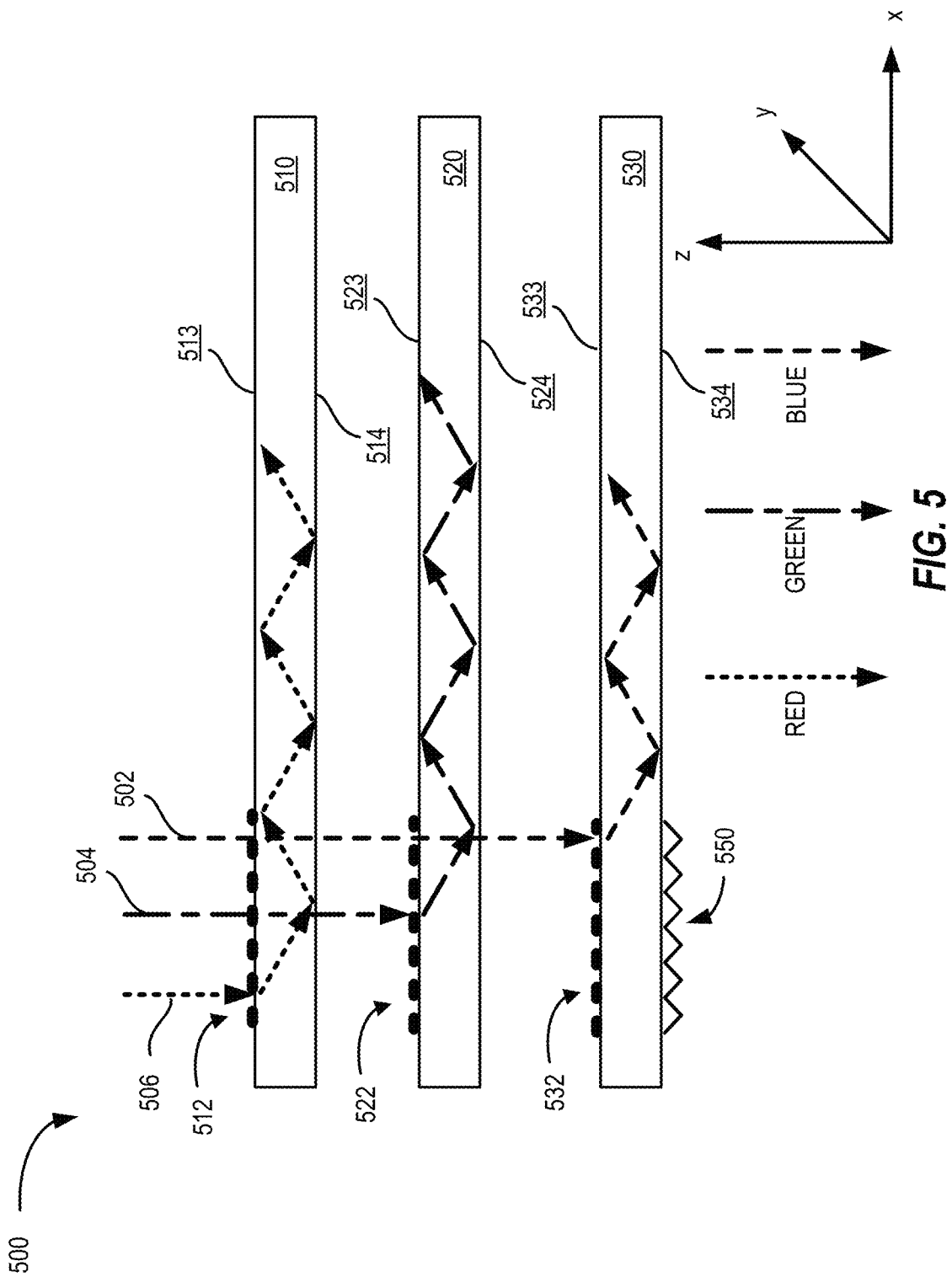
FIG. 5 is a cross-sectional view of an eyepiece with aligned diffractive optical elements and an integrated retroreflector according to an embodiment of the present invention.

FIG. 5 is a cross-sectional view of an eyepiece with aligned diffractive optical elements and an integrated retroreflector according to an embodiment of the present invention. Eyepiece 500, which can be used to project an image to a viewer's eye, includes a first planar waveguide 510, also referred to as a first waveguide, positioned in a first lateral plane (i.e., in a first x-y plane and positioned at a first longitudinal (z-axis) position). The first planar waveguide 510 includes a first diffractive optical element (DOE) 512 disposed at a first lateral position (i.e., a first x-y coordinate position). The first DOE 512 may include an incoupling grating (ICG) formed either on the first surface 513, which can also be referred to as an incident light surface, of the first planar waveguide 510 or a second surface 514, which can be referred to as an opposing surface, of the first waveguide 510 opposite to the first surface. In some embodiments, the first DOE 512 may include an ICG formed either on both the first surface 513 of the first planar waveguide 510 and the second surface 514 of the first waveguide 510 opposite to the first surface. The first DOE 512 may be a transmission grating configured to diffract image light in the first wavelength range, e.g., blue image light, into the first planar waveguide 510 to be guided toward the second lateral region of the first waveguide 510. The second lateral region may be a region between the ICG and an OPE. A portion of the image light that is not coupled into the first waveguide 510 may be transmitted through the first waveguide 510.

The eyepiece 500 also includes a second planar waveguide 520, also referred to as a second waveguide, positioned in a second lateral plane (i.e., at a second longitudinal position) adjacent to the first lateral plane. The second planar waveguide 520 includes a second DOE 522 disposed at the first lateral position below the first DOE 512. The second DOE 522 may include an incoupling grating (ICG) formed either on the first surface 523 of the second waveguide 520, a second surface 524 of the second waveguide 520 opposite to the first surface or both the first surface 523 and the second surface 524 opposite to the first surface. The second DOE 522 may be a transmission grating configured to diffract image light in the second wavelength range, e.g., green image light, into the second waveguide 520 to be guided toward the second lateral region of the second waveguide 520. The second lateral region may be a region between the ICG and an OPE. A portion of the image light that is not coupled into the second waveguide 520 may be transmitted through the second planar waveguide 520.

The eyepiece 500 also includes a third planar waveguide 530, also referred to as a third waveguide, positioned in a third lateral plane (i.e., at a third longitudinal position) adjacent to the second lateral plane. The third planar waveguide 530 includes a third DOE 532 disposed at the first lateral position below the first DOE 512 and the second DOE 522 and aligned along a longitudinal direction (i.e., aligned with the z-axis). The third DOE 532 may include an incoupling grating (ICG) formed either on the first surface 533 of the third planar waveguide 530 or a second surface 534 of the third planar waveguide 530 opposite to the first surface. The third DOE 532 may be a transmission grating configured to diffract image light in the third wavelength range, e.g., red image light, into the third planar waveguide 530 to be guided toward the second lateral region of the third planar waveguide 530. The second lateral region may be a region between the ICG and an OPE. A portion of the image light that is not coupled into the third planar waveguide 530 may be transmitted through the third planar waveguide 530.

Although all three DOEs (e.g., the first DOE 512, the second DOE 522, and the third DOE 532) are aligned in the embodiment illustrated in FIG. 5, this is not required by the present disclosure and the DOEs can be spatially separated at different lateral positions. As an example, the first DOE 512 (e.g., to diffract green light) can be spatially separated from the second DOE 522 and the third DOE 532, which can be aligned. In this example, since green light is in the middle of the visible spectrum, it is spatially separated from the blue and red light, which are not strongly diffracted in the DOEs for the other color, enabling the blue and red DOEs (e.g., the second DOE 522 and the third DOE 532) to be spatially aligned. One of ordinary skill in the art would recognize many variations, modifications, and alternatives.

Referring to FIG. 5, a first input beam 502 (e.g., a blue input beam) is coupled into the first planar waveguide 510 via incoupling DOE 512. In a similar manner, a second input beam 504 (e.g., a green input beam) is coupled into the second planar waveguide 520 via incoupling DOE 522 and a third input beam 506 (e.g., a red input beam) is coupled into the third planar waveguide 530 via incoupling DOE 532. After passing through the waveguides, light not diffracted into the waveguides is retroreflected by retroreflector 550 as described more fully below. As illustrated in FIG. 5, the retroreflector 550 is positioned at the first lateral position and is aligned with the incoupling DOEs. The retroreflector may be configured to reflect image light transmitted through the three planar waveguides back toward the projector (not shown). As described below, the retroreflected light can be coupled into the waveguides as it propagates toward the projector, thereby increasing the brightness and contrast of the light field that is output to the viewer.

According to some other embodiments, the order of the planar waveguides 510, 520, and 530 may be different from that illustrated in FIG. 5. Further, the eyepiece 500 may include fewer than three waveguides (e.g., two waveguides), or more than three waveguides (e.g., nine waveguides, three for each color), according to some embodiments. In some embodiments, the eyepiece 500 may include waveguides for colors other than red, green, and blue. For example, it may include waveguides for magenta and cyan, in place of or in addition to red, green, and blue.

Figure 6:
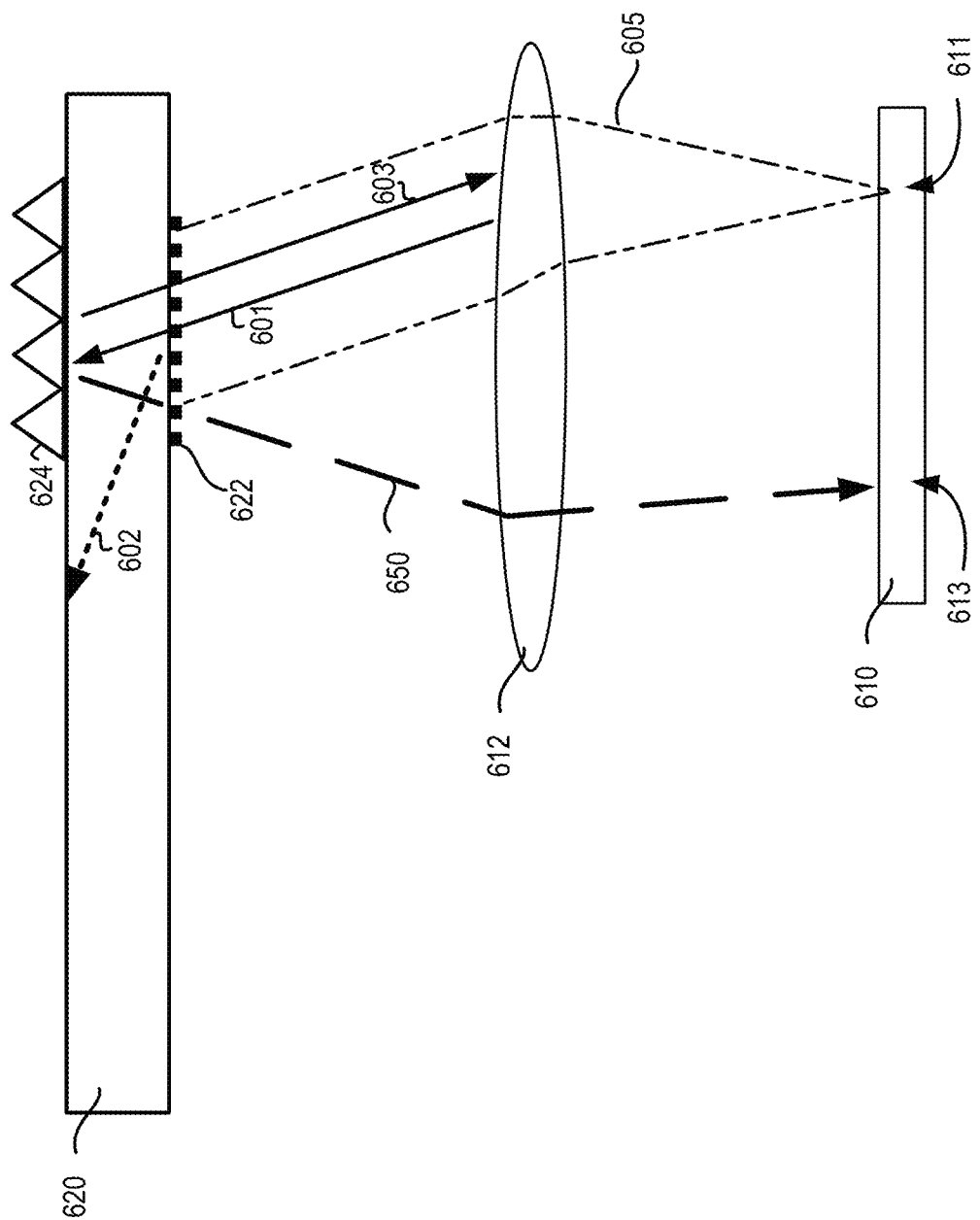
FIG. 6 is a cross-sectional view of elements of a projector, an eyepiece, and a retroreflector according to an embodiment of the present invention.

FIG. 6 is a cross-sectional view of elements of a projector, an eyepiece, and a retroreflector according to an embodiment of the present invention. As illustrated in FIG. 6, light used to generate virtual images produced by planar waveguide 620 of an eyepiece is reflected from display element 610 (e.g., a liquid crystal on silicon (LCOS) display). For purposes of illustration, a pixel 611 of the display element is illustrated as reflecting incident light. The reflected light passes through projection optics 612, illustrated as a single lens in FIG. 6. It will be appreciated by one of skill in the art that the illustration of the projection optics as a single lens is merely for purposes of clarity and, in practice, multiple optical elements, including lenses, stops, and the like, will be utilized in projection optics 612. If an emissive display element is utilized, light emitted by the display element passes through projection optics 612 in a similar manner. Embodiments are not limited to an LCOS display and other display technologies, including both reflective and emissive displays, are included within the scope of the present invention.

After passing through projection optics 612, light illustrated by ray 601 impinges on the incoupling DOE 622. A first portion of the incident light is diffracted by the incoupling DOE 622 and propagates, based on TIR, toward the OPE and EPE of the planar waveguide 620 of the eyepiece as illustrated by ray 602. It will be appreciated that light will generally be diffracted into multiple orders and only the diffracted order directed toward the OPE is illustrated in FIG. 6 for purposes of clarity. As a result of diffraction into multiple orders, a light absorber (not shown) may be integrated into the planar waveguide to absorb light diffracted into orders directed away from the OPE. A second portion of the incident light passes through the incoupling DOE 622 as illustrated by ray 601 and is retroreflected by retroreflector 624.

The retroreflector 624 reflects the incident light, with the reflected light being illustrated by ray 603, along a direction that is parallel, but opposite in direction from the incident light's original direction. Although ray 601 in FIG. 6 is laterally offset from ray 603, it will be appreciated that in actual implementation, the lateral offset of the retroreflected light will be small in comparison to the beam diameter and the lateral offset if utilized in FIG. 6 in order to provide clarity in the illustration. In some embodiments, the lateral dimensions or size of the retroreflector will be approximately equal to the lateral dimensions of the incoupling diffractive optical element although this is not required and the lateral dimensions of the retroreflector can be greater than or less than that of the incoupling diffractive optical element. One of ordinary skill in the art would recognize many variations, modifications, and alternatives.

A number of different retroreflector designs can be utilized according to embodiments of the present invention, including a corner cube prism film, corner cube arrays, with the corner cube dimension on the order of tens of microns to several hundred microns, metallized micro-prism structures, and the like. Using nanoimprinting, semiconductor processing techniques, including maskless lithography, additive manufacturing techniques, or the like, an integrated retroreflector having a lateral extent, for example, substantially matched to the lateral extent of the incoupling diffractive optical element can be fabricated on the distal surface of the planar waveguide layer. Thus, a retroreflector having lateral dimensions measured along the x and y axes of 0.5 to −3.0 mm and a height, measured along the longitudinal z-direction of 20-600 μm, for example, in the range of tens of microns to several hundred microns, can be utilized in various embodiments of the present invention. In these embodiments, the dimensions of the features making up the retroreflector can be a small fraction of the lateral dimensions of the retroreflector, for example, corner cubes less than 100 μm in dimension arrayed to provide a retroreflector several mm in dimension. As will be evident to one of skill in the art, the structure of the retroreflector is not limited to corner cubes, but can include other retroreflector structures including spherical reflectors, pyramidal reflectors, and the like.

As illustrated by light cone 605 in FIG. 6, the retroreflected light passes back through projection optics 612 and impinges on the display element at the pixel location from which light was initially reflected. In contrast with specular reflection from the eyepiece elements, light that is retroreflected propagates at the same angle as the incident light as described above, not at an angle equal and opposite to the angle of incidence. As a result, the light propagating at the same angle will be diffracted at the same angle in the planar waveguide, thereby overlapping with the initially diffracted light represented by ray 602 and representing the same pixel to the user. Moreover, in contrast with specular reflection, which results in specularly reflected light impinging on a mirror-image pixel of the display element, the light retroreflected from retroreflector 624 impinges on the original pixel of the display element. As a result, artifacts (i.e., ghost images) are reduced or prevented by embodiments of the present invention.

Thus, the prevention or reduction of artifacts by embodiments of the present invention contrasts with systems in which a mirrored surface can be positioned adjacent the planar waveguide 620 and merely result in specular reflection. As illustrated in FIG. 6, if ray 601 were incident on a mirrored surface (not shown), reflection by the mirrored surface would result in reflected ray 650, which would reflect at an angle of reflection equal and opposite to the angle of incidence of ray 601. It should be noted that reflected ray 650 is illustrated merely for comparison with an approach utilizing a mirrored surface and is not physically present in the system illustrated in FIG. 6. Reflected ray 650 would then be imaged by projection optics 612 and impinge on display element 610 at a mirror image position 613 with respect to pixel 611. Thus, light associated with pixel 611 will appear as an artifact at mirror image position 613. If the pixel at the mirror image position 613 is reflective, reflected ray 650 can be reflected back toward projection optics 612 for eventual projection to the user. Thus, as described herein, the use of a retroreflector prevents the generation of the artifact since the retroreflected light, rather than being imaged at mirror image position 613, is imaged at the original position associated with pixel 611. Although a single pixel is discussed in relation to artifact generation in relation to FIG. 6, it will be appreciated that the single pixel example is provided merely by way of example and for clarity and the discussion related to a single pixel is applicable to other pixels in the display as appropriate.

Figure 7:
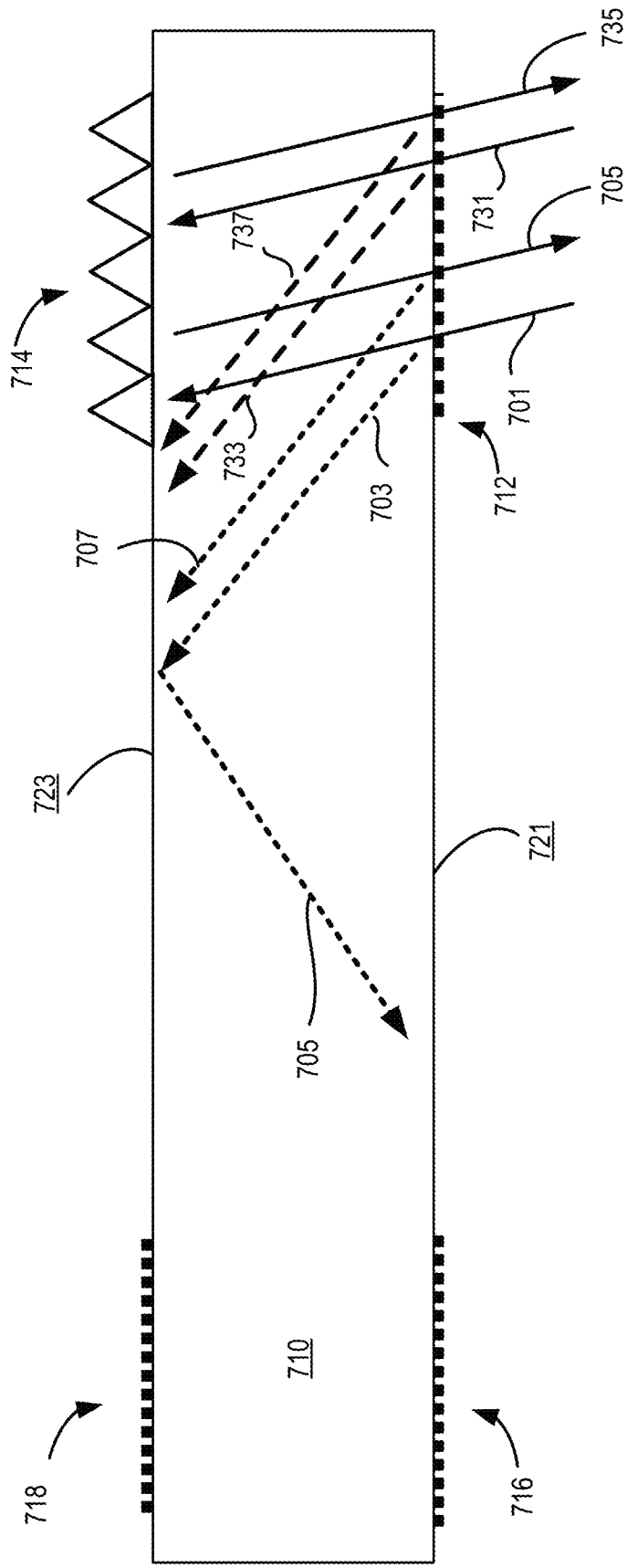
FIG. 7 is a cross-sectional view of a planar waveguide of an eyepiece and integrated retroreflector according to an embodiment of the present invention.

FIG. 7 is a cross-sectional view of a planar waveguide of an eyepiece and integrated retroreflector according to an embodiment of the present invention. Referring to FIG. 7, image light, represented by ray 701 is incident on proximal surface 721 (i.e., adjacent to the projector) of planar waveguide layer 710. The planar waveguide layer 710 includes an incoupling DOE 712, an integrated retroreflector 714, and orthogonal pupil expander (OPE) and exit pupil expander (EPE), which are illustrated by diffractive elements 716 and 718, respectively.

A first portion of the image light represented by ray 701 is diffracted by the incoupling diffractive optical element 712 as illustrated by ray 703. The remaining portion of the image light represented by ray 701 passes through the planar waveguide layer 710 and is retroreflected by retroreflector 714. In the embodiment illustrated in FIG. 7, the retroreflector 714 is imprinted (e.g., using nanoimprinting) on the distal surface 723 of the planar waveguide layer 710. However, other optical arrangements are included within the scope of the present invention, including a retroreflector positioned a predetermined distance from the distal surface 723 of the planar waveguide layer 710. Thus, the retroreflector can be integrated into the surface of the planar waveguide layer, resulting in a non-planar region of the planar waveguide layer, be a separate structure joined (e.g., bonded) to the planar surface of the planar waveguide layer, or be a separate structure optically coupled, but spatially separated from the planar waveguide layer. One of ordinary skill in the art would recognize many variations, modifications, and alternatives.

A first portion of the retroreflected light 705 is diffracted by incoupling DOE 712 as illustrated by ray 707. It will be appreciated that light will generally be diffracted along multiple orders and only the diffracted order directed toward the OPE is illustrated in FIG. 7 for purposes of clarity. This diffracted light is directed toward the OPE and EPE for eventual delivery to the viewer along with the initially diffracted light represented by ray 703. Since both rays 703 and 707 are associated with the same pixel of the display element, the brightness associated with this pixel will be increased. Thus, the use of the integrated retroreflector 714 effectively provides a double pass for light diffracted by the incoupling diffractive optical element, increasing the incoupling efficiency and effectively increasing the diffraction efficiency of the incoupling diffractive optical element.

The remainder of the retroreflected light 705 passes back through the projection optics and impinges on the display element at the pixel location from which light was initially reflected. The light reaching the display element can reflect off of the display element a second time (and additional subsequent times) as illustrated by ray 731. The light reflected from the display element a second time can be referred to as recycled image light. This recycled image light, represented by ray 731, can be used to produce diffracted rays 733 and 737, which are associated with diffraction by incoupling diffractive optical element 712 on the first pass of the recycled image light through incoupling diffractive optical element 712 (i.e., associated with ray 731) and diffraction by incoupling diffractive optical element 712 on the second pass of the recycled image light through incoupling diffractive optical element 712 after the second retroreflection from retroreflector 714 (i.e., associated with ray 735). As illustrated in FIG. 7, since rays 701 and 731 are reflected from the same pixel, they are parallel.

As will be evident to one of skill in the art, subsequent reflections from the display element will occur during the remainder of the frame time associated with each color and each depth plane as the light propagating backwards from the retroreflector illuminates the original pixel of the display element with the same cone angle as the light that was originally reflected from the original pixel. Thus, reflections representing the original pixel can be generated by reflection from the display element and increase eyepiece efficiency. In actual implementation, since the frame time is much greater than the round trip propagation time from the display element to the retroreflector, the recycling of the image light can result in diffraction of the image light into the planar waveguide until the intensity of the reflected light at the display element is negligible. As a result, the recycling of light produced by multiple reflections from the display element will result in increased image brightness for the user and increased system efficiency. One of ordinary skill in the art would recognize many variations, modifications, and alternatives.

As illustrated in FIG. 7, when light diffracted by incoupling diffractive optical element 712 impinges on distal surface 723 to the left of integrated retroreflector 714, the diffracted light is totally internally reflected and propagates towards diffractive elements 716 and 718. If the diffracted light were to impinge on integrated retroreflector 714, the diffracted light could be retroreflected back toward incoupling diffractive optical element 712, at which point it could be diffracted back toward the projection optics, never resulting in light coupling into planar waveguide layer 710. In order to prevent the undesired retroreflection of diffracted light, the thickness of the planar waveguide layer 710 can be increased to enable additional propagation in the lateral direction of the diffracted light before reaching distal surface 723. Additionally or alternatively, the lateral dimensions of the ICG can be decreased. Thus, in some embodiments, lateral dimensions (e.g., area) of the retroreflector are selected such that light diffracted from the incoupling DOE is able to totally internally reflect in the waveguide after diffraction, not impinge on the retroreflector after diffraction and then be retroreflected back toward the incoupling DOE, thereby preventing the light from reaching the EPE/OPE portion of the planar waveguide. Moreover, if an air gap is introduced between the retroreflector and the planar waveguide layer, discussed in additional detail with respect to FIG. 8, prevention of retroreflection of diffracted light can be achieved.

It should be noted that diffractive elements 716 and 718 can be implemented as a combined OPE/EPE, which can be referred to as a combined pupil expander (CPE). A CPE can be implemented in a two-sided configuration as illustrated in FIG. 7 or in a single-sided configuration. For example, the CPE can include an OPE component represented by diffractive element 716 and an EPE component represented by diffractive element 718. Thus, an OPE component (e.g., including OPE gratings) can be located on one side of substrate 710 and an EPE component (e.g., including EPE gratings) can be located on the other side of substrate 710. The OPE component and/or the EPE component can be implemented as 2D gratings or 1D gratings as appropriate to the particular application. Additional description related to the fabrication of CPEs is provided in commonly assigned U.S. Pat. No. 10,481,317, the disclosure of which is hereby incorporated by reference in its entirety for all purposes.

Figure 8:
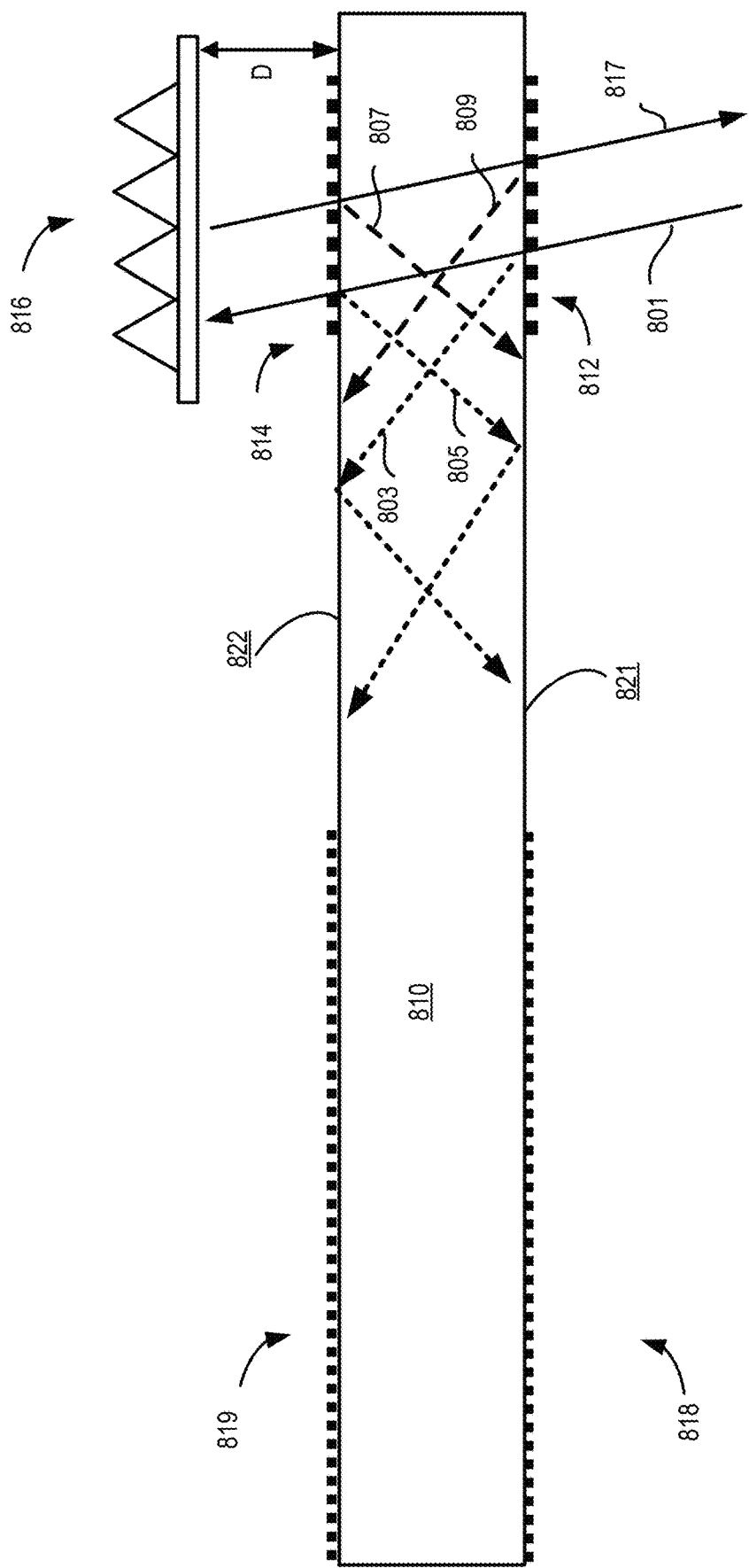
FIG. 8 is a cross-sectional view of a planar waveguide with multiple diffractive optical elements and an integrated retroreflector according to an embodiment of the present invention.

FIG. 8 is a cross-sectional view of a planar waveguide with multiple diffractive optical elements and an integrated retroreflector according to an embodiment of the present invention. Referring to FIG. 8, an incoupling diffractive optical element has been integrated with both the proximal surface of the planar waveguide layer as well as the distal surface of the planar waveguide layer. Image light, represented by ray 801 is incident on proximal surface 821 (i.e., adjacent to the projector) of planar waveguide layer 810. The planar waveguide layer 810 includes a first incoupling DOE 812, a second incoupling diffractive optical element 814, an integrated retroreflector 816, and orthogonal pupil expander (OPE) and exit pupil expander (EPE), which are illustrated by diffractive elements 818 and 819, respectively.

A first portion of the image light represented by ray 801 is diffracted by the first incoupling diffractive optical element 812 as illustrated by ray 803. The remaining portion of the image light represented by ray 801 passes through the planar waveguide layer 810 and a second portion of the remaining portion is diffracted by the second incoupling diffractive optical element 814 as illustrated by ray 805. Thus, the use of incoupling diffractive optical elements on both the proximal and distal surfaces of the planar waveguide layer increases the diffraction efficiency of image light toward the OPE.

Light that passes through the second incoupling diffractive optical element is retroreflected by retroreflector 816. In some embodiments, the retroreflector 816 is imprinted (e.g., using nanoimprinting) on the distal surface 822 of the planar waveguide layer 810. However, other optical arrangements are included within the scope of the present invention, including a retroreflector positioned a predetermined distance D from the distal surface 822 of the planar waveguide layer 810. Thus, the retroreflector can be integrated into the surface of the planar waveguide layer, resulting in a non-planar region of the planar waveguide layer, be a separate structure joined (e.g., bonded) to the planar surface of the planar waveguide layer, or be a separate structure optically coupled but spatially separated from the planar waveguide layer. One of ordinary skill in the art would recognize many variations, modifications, and alternatives.

As illustrated in FIG. 8, in some embodiments, the incoupling DOEs are positioned on both the front surface 821 as well as the back surface 822 of the planar waveguide 810. In these embodiments, the retroreflector can be positioned a predetermined distance from the back surface of the planar waveguide and spatially separated from the back surface, as a result, by the predetermined distance. In these embodiments, the retroreflector may be fabricated as a separate structure from the planar waveguide and can be mechanically mounted to the planar waveguide or a support structure supporting both the planar waveguide and the retroreflector structure. The spatial separation can be filled with the ambient environment (e.g., an air gap), a spacer material, or the like. If a spacer material is utilized, the index of refraction of the planar waveguide, the incoupling DOE 814 on the back surface 822 of the planar waveguide 810, the spacer material, and/or the retroreflector should be considered to avoid index matching between the spacer material and the incoupling DOE 814, which can potentially reduce the efficiency of the incoupling DOE as the index of refraction difference between the incoupling DOE and the spacer material effectively washes out the DOE.

In some embodiments, the incoupling DOEs are fabricated using polymer materials. If the incoupling DOE 814 utilizes metal materials to provide the diffractive effect, the decrease in diffraction efficiency can be small in comparison to materials that are more closely index matched to the spacer material. In some embodiments, the retroreflector can be formed in contact with the incoupling DOE 814 using an additive manufacturing process. In these embodiments, the use of materials with different indices of refraction for the incoupling DOE (e.g., metal) and the spacer material (e.g., polymer) and/or the retroreflector (e.g., polymer) can result in low levels of index matching and maintenance of the desired DOE efficiency.

In a manner similar to that discussed in relation to FIG. 7, a first portion of the retroreflected light is diffracted by incoupling DOE 814 as illustrated by ray 807 and a second portion, after passing through the planar waveguide layer, is diffracted by incoupling DOE 812 as illustrated by ray 809. Since the retroreflected light 817 propagates along the same direction as (i.e., opposite to the direction of propagation of) the original image light, the diffraction of the retroreflected light will overlap with rays 803 and 805 associated with diffraction during the first pass through the planar waveguide layer. As will be evident to one of skill in the art, the diffraction order will differ (i.e., either positive or negative orders) depending on whether the DOE is operating in reflection or transmission. As examples, ray 803 can be a positive diffracted order produced by incoupling DOE 812 operating in transmission and ray 805 can be a positive diffracted order produced by incoupling DOE 814 operating in reflection. Ray 807 can be a negative diffracted order produced by incoupling DOE 814 operating in transmission and ray 809 can be a negative diffracted order produced by incoupling DOE 812 operating in reflection.

In comparison with the embodiment illustrated in FIG. 7, the use of two incoupling diffractive optical elements enables light to be diffracted four times during a round trip pass through the incoupling diffractive optical element as illustrated by rays 803, 805, 807, and 809. Since the diffracted light directed toward the OPE and EPE for eventual delivery to the viewer is associated with the same pixel of the display element, the brightness associated with this pixel will be increased as illustrated by rays 803, 805, 807, and 809. In the embodiment illustrated in FIG. 8, the use of two incoupling diffractive optical elements and the integrated retroreflector 816 effectively provides a double pass for light diffracted by each of the incoupling diffractive optical elements, increasing the incoupling efficiency and effectively increasing the diffraction efficiency of the incoupling diffractive optical element.

The remainder of the retroreflected light passes back through the projection optics and impinges on the display element at the pixel location from which light was initially reflected. The light reaching the display element can reflect off of the display element a second time (and additional subsequent times) and impinge on the waveguide layer 810. In a manner similar to that discussed in relation to FIG. 7, the light reflected from the display element a second time can be referred to as recycled image light. This recycled image light (not shown), can be used to produce diffracted rays, which are associated with diffraction by first incoupling diffractive optical element 812 and second incoupling diffractive optical element 814 on the first pass of the recycled image light through the planar waveguide layer and diffraction by the first incoupling diffractive optical element 812 and second incoupling diffractive optical element 814 on the second pass of the recycled image light through the planar waveguide layer, respectively.

Figure 9:
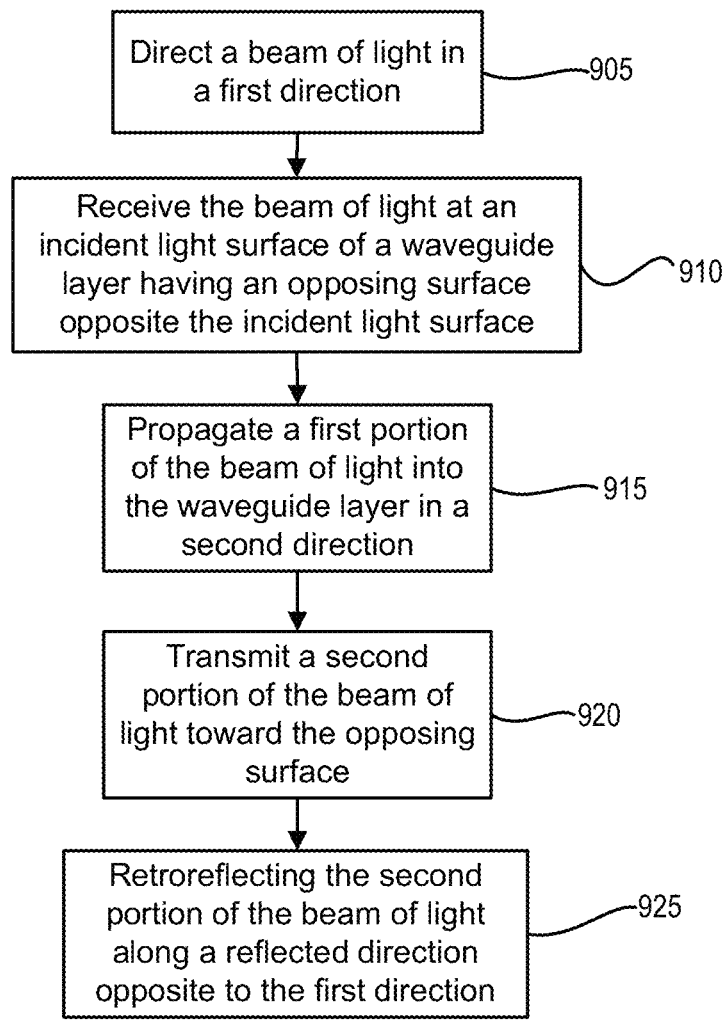
FIG. 9 is a simplified flowchart illustrating a method of reducing artifacts in an eyepiece according to an embodiment of the present invention.

FIG. 9 is a simplified flowchart illustrating a method of reducing artifacts in an eyepiece according to an embodiment of the present invention. The method comprises directing a beam of light in a first direction at step 905. The method further comprises receiving the beam of light at an incident light surface of a waveguide layer having an opposing surface opposite the incident light surface at step 910.

The method further comprises propagating, at a first diffractive optical element, a first portion of the beam of light into the waveguide layer in a second direction at step 915. The method further comprises transmitting, by the first diffractive optical element, a second portion of the beam of light toward the opposing surface at step 920. The method further comprises retroreflecting the second portion of the beam of light along a reflected direction opposite to the first direction at step 925.

In some embodiments, the method further comprises propagating, at the first diffractive optical element, a first fraction of the second portion of the beam of light into the waveguide layer in the second direction. In some embodiments, the method further comprises transmitting, at the first diffractive optical element, a second fraction of the second portion of the beam of light along the reflected direction. In some embodiments, the method further comprises reflecting at least a portion of the first fraction in the first direction or toward the waveguide layer. In some embodiments, the method further comprises receiving the reflected portion at the incident light surface of the waveguide layer. In some embodiments, the method further comprises propagating, at the first diffractive optical element, a portion of the reflected portion into the waveguide layer in the second direction.

In some embodiments, the first diffractive optical element is disposed on the incident light surface. In some embodiments, retroreflecting the second portion of the beam of light includes retroreflecting the second portion along a reflected direction opposite to the first direction. In some embodiments, directing the beam of light in the first direction comprises reflecting a time sequential color beam from a display element.

Figure 10A:
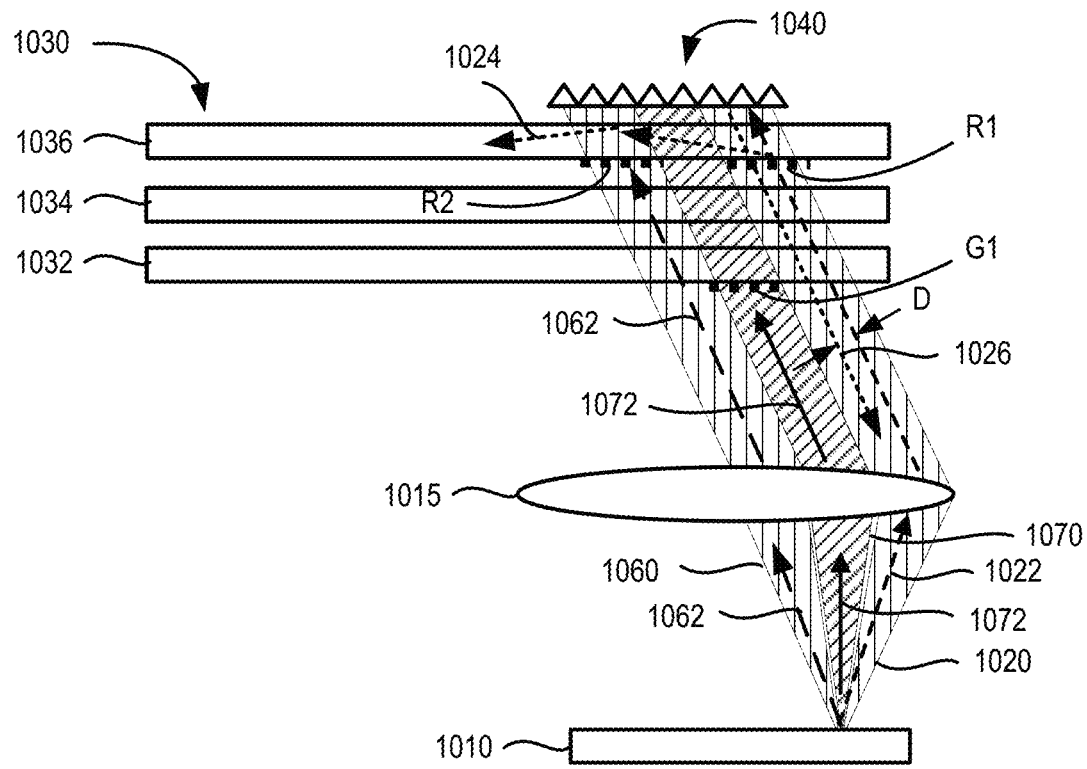
FIG. 10A is a simplified cross-sectional view of a planar waveguide utilized in a multi-pupil system according to an embodiment of the present invention.
Figure 10B:
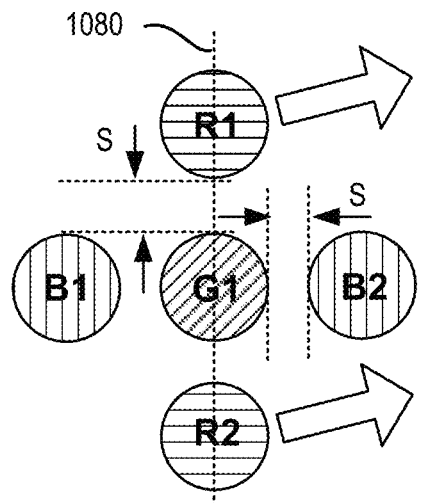
FIG. 10B is a simplified plan view of a multi-pupil layout for the planar waveguide illustrated in FIG. 10A.

FIG. 10A is a simplified cross-sectional view of a planar waveguide utilized in a multi-pupil system according to an embodiment of the present invention. Referring to FIG. 10A, a display element 1010 (e.g., an LCOS display panel) is illuminated using a multi-pupil pixel layout. FIG. 10B is a simplified plan view of a multi-pupil layout for the planar waveguide illustrated in FIG. 10A. As illustrated in FIG. 10B, each pixel includes five arrayed light sources that are aligned with five corresponding incoupling DOEs R1, R2, G1, B1, and B2. Although a particular array pattern is illustrated in FIG. 10B, the present invention is not limited to this particular array pattern and other array patterns are included within the scope of the present invention. Additionally, although two incoupling DOEs corresponding to light sources associated with two primary colors (red and blue) are utilized in conjunction with a single incoupling DOE corresponding to a light source associated with the third primary color (green), this is also not required and different color combinations can be utilized as appropriate to the particular application. In FIG. 10A, the illustrated cross-section corresponds to bisector 1080 illustrated in FIG. 10B. Thus, incoupling DOEs B1 and B2 will be disposed at locations in front of the plane of the figure and behind the plane of the figure, respectively, in the illustrated embodiment.

Referring to FIG. 10A, light from a first light source (e.g., a red source) corresponding to incoupling DOE R1 is reflected from the display element 1010 to form light cone 1020. An exemplary ray included in light cone 1020 is illustrated by ray 1022, which is imaged using projection optics 1015 to impinge on the eyepiece 1030 including three planar waveguides 1032, 1034, and 1036, each associated with a primary color. In an embodiment, planar waveguide 1032 is associated with green wavelengths, planar waveguide 1034 is associated with blue wavelengths, and planar waveguide 1036 is associated with red wavelengths. Ray 1022 passes through planar waveguides 1032 and 1034 and impinges on incoupling DOE R1. A fraction of the incident light is diffracted to propagate in the plane of the planar waveguide as illustrated by diffracted ray 1024. A fraction of the incident light also passes through the incoupling DOE R1 to impinge on retroreflector 1040. Retroreflected light represented by retroreflected ray 1026 propagates in a direction opposite to that of ray 1022 as it propagates back to display element 1010. The retroreflected light, including retroreflected ray 1026, which is shifted in the lateral direction by distance D after retroreflection, is characterized by light cone 1020 during propagation back to display element 1010.

When the retroreflected light in light cone 1020, which is represented by retroreflected ray 1026, impinges on the display element, specular reflection of the retroreflected light will occur, resulting in reflected light cone 1060, which will be imaged by projection optics 1015 to impinge on the eyepiece as represented by reflected ray 1062. Because light cone 1020 has a center ray that is not normal to display element 1010, which results from the light sources being off-axis, light cone 1060 will also have a center ray that is equal and opposite to the center ray of light cone 1020. The light reflected from the display element 1010 in light cone 1060 will pass through planar waveguides 1032 and 1034 and impinge on incoupling DOE R2. Accordingly, a fraction of the incident light will be diffracted to propagate in the plane of the planar waveguide (diffracted rays are not shown for purposes of clarity). A fraction of the incident light will also pass through the incoupling DOE R2 to impinge on retroreflector 1040, resulting in retroreflected light that will propagate back to the display element. After specular reflection from the display element, retracing of the optical path represented by ray 1022, retroreflected ray 1026, and ray 1062 will occur during the remainder of the frame time associated with each color and each depth plane. Thus, multiple passes through incoupling DOEs R1 and R2 will result, increasing incoupling efficiency of planar waveguide 1036.

Referring once again to FIG. 10A, light from the second light source (e.g., a green source) corresponding to incoupling DOE G1 is reflected from the display element 1010 to form light cone 1070. An exemplary ray included in light cone 1070 is illustrated by ray 1072, which is imaged using projection optics 1015 to impinge on the eyepiece 1030. Ray 1072 impinges on incoupling DOE G1. A fraction of the incident light is diffracted to propagate in the plane of the planar waveguide (diffracted rays are not shown for purposes of clarity). A fraction of the incident light also passes through the incoupling DOE G1 to impinge on retroreflector 1040. Retroreflected light represented by retroreflected ray (not shown for purposes of clarity) propagates in a direction opposite to that of ray 1072 as it propagates back to display element 1010.

When the retroreflected light in light cone 1070, which can be represented by a retroreflected ray, impinges on the display element 1010, specular reflection of the retroreflected light will occur. Because light cone 1070 has a center ray that is normal to display element 1010, the light cone associated with light propagating from the display element to the eyepiece will overlap with the light cone associated with retroreflected light propagating from retroreflector 1040 to the display element. After specular reflection from the display element, retracing of the optical path represented by ray 1072 and the retroreflected ray will occur during the remainder of the frame time associated with each color and each depth plane. Thus, multiple passes through incoupling DOE G1 will result in increased incoupling efficiency of planar waveguide 1032.

In another embodiment, rather than utilizing a second incoupling DOE R2 for planar waveguide 1036, the second incoupling DOE R2 can be removed. Thus, incoupling DOE R2, as well as incoupling DOE B2 are optional in some embodiments. In this case, after specular reflection of retroreflected light, the light will pass through all three planar waveguides, be retroreflected a second time, and specularly reflect back in light cone 1020, and subsequently impinge on incoupling DOE R1.

Figure 11:
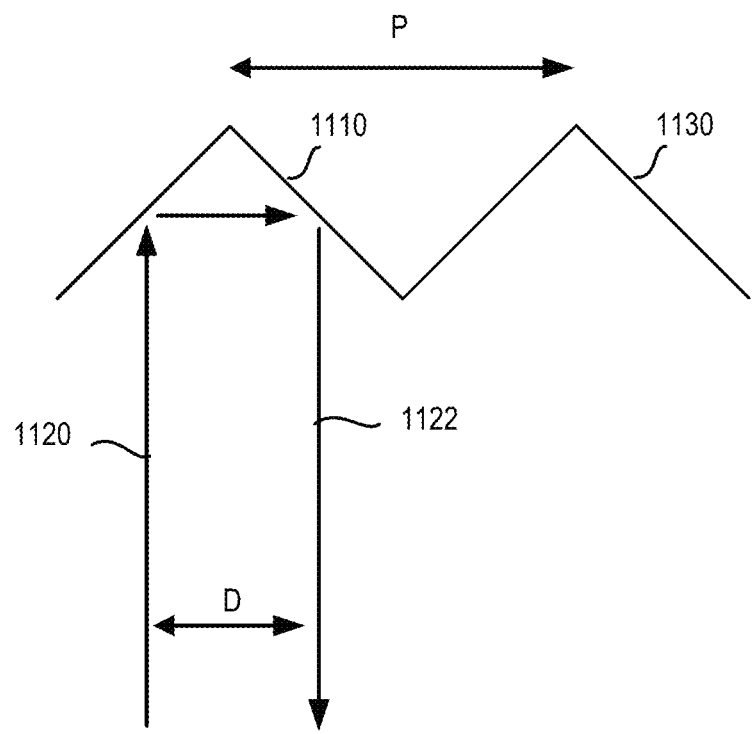
FIG. 11 is a simplified schematic diagram illustrating an element of a retroreflector according to an embodiment of the present invention.

FIG. 11 is a simplified schematic diagram illustrating an element of a retroreflector according to an embodiment of the present invention. As illustrated herein, retroreflected light is laterally shifted after retroreflection. Thus, although the directions of propagation before and after retroreflector are parallel, a lateral shift is present. Embodiments of the present invention take this lateral shift into account in designing the dimensions of the retroreflector as well as the incoupling DOEs. Referring to FIG. 11, an element of a retroreflector is illustrated as corner cube 1110. Incident light represented by ray 1120 impinges on corner cube 1110 and is retroreflected as retroreflected ray 1122. After retroreflection, lateral shift D is present between the incoming and retroreflected rays. Because of this lateral shift, it is possible that retroreflected light may couple into an adjacent pupil (i.e., incoupling DOE), resulting in crosstalk. Accordingly, this crosstalk can be prevented by utilizing a small pitch size P between adjacent elements of the retroreflector, illustrated by adjacent corner cubes 1110 and 1130. In some embodiments, the pitch size P is less than 100 µm, whereas in other embodiments, the pitch size ranges from about 10 µm to about 500 µm.

Because of the small pitch sizes utilized by embodiments of the present invention, the lateral shift resulting from retroreflector will typically not result in crosstalk since the separation between adjacent pupils is typically on the order of several hundred microns. Referring to FIG. 10B, the separation S between the incoupling DOEs, including, for example, incoupling DOE R1 and incoupling DOE G1 and/or incoupling DOE G1 and incoupling DOE B2 as illustrated, is on the order of 100 µm in some embodiments. Thus, for pitch sizes less than 100 µm, the lateral shift will not result in crosstalk between incoupling DOE R1 and incoupling DOE G1. Therefore, embodiments of the present invention utilize fabrication processes for the retroreflector, particularly the retroreflector elements, that are small enough to prevent crosstalk between adjacent incoupling DOEs that would otherwise result from the lateral shift that can occur during retroreflection. As described, some embodiments utilize a spacing or separation between adjacent incoupling DOEs in the lateral plane of greater than 100 µm, which coupled with retroreflector elements pitch sizes (measured in the lateral plane) of less than 100 µm, for example, in the range of tens of microns, prevents crosstalk. As will be evident to one of skill in the art, pitch sizes for the retroreflector elements that are very small, for example, on the order of the wavelength of light, may result in undesirable diffraction effects. One of ordinary skill in the art would recognize many variations, modifications, and alternatives.

It is also understood that the examples and embodiments described herein are for illustrative purposes only and that various modifications or changes in light thereof will be suggested to persons skilled in the art and are to be included within the spirit and purview of this application and scope of the appended claims.

What is claimed is:

1. A display system comprising:
projection optics configured to project a beam of light in a first direction;
an eyepiece unit including:
a first waveguide layer disposed in a first lateral plane and including an incident light surface and an opposing surface opposite the incident light surface;
an incoupling diffractive optical element disposed on the incident light surface, wherein the incoupling diffractive optical element is configured to:
incouple a first portion of the beam of light and to propagate the first portion of the beam of light by total internal reflection in a second direction; and
transmit a second portion of the beam of light along the first direction; and
a retroreflector disposed adjacent the opposing surface, wherein the retroreflector is configured to retroreflect the second portion of the beam of light along a reflected direction opposite to the first direction.

2. The display system of claim 1 wherein the eyepiece unit further comprises:
an orthogonal pupil expander region laterally displaced from the incoupling diffractive optical element; and
an exit pupil expander (EPE) region laterally displaced from the incoupling diffractive optical element.

3. The display system of claim 1 further comprising a projection display configured to direct the beam of light to the projection optics.

4. The display system of claim 1 wherein the beam of light comprises a plurality of colors projected sequentially.

5. The display system of claim 1 wherein the second direction is parallel to the first lateral plane.

6. The display system of claim 1 wherein the retroreflector is disposed on the opposing surface.

7. The display system of claim 1 wherein the retroreflector is disposed parallel to the opposing surface at a predetermined distance from the opposing surface.

8. The display system of claim 1 wherein the incoupling diffractive optical element is further configured to:
incouple a third portion of the second portion of the beam of light and to propagate the third portion by total internal reflection in the second direction; and
transmit a fourth portion of the beam of light along the reflected direction.

9. The display system of claim 1, further comprising:
a second waveguide layer disposed in a second lateral plane adjacent to the first lateral plane and including a second incoupling diffractive optical element disposed at a second lateral position, a second waveguide optically coupled to the second incoupling diffractive optical element, and a second outcoupling diffractive optical element optically coupled to the second waveguide; and
a third waveguide layer disposed in a third lateral plane and including a third incoupling diffractive optical element disposed at a third lateral position, a third waveguide optically coupled to the third incoupling diffractive optical element, and a third outcoupling diffractive optical element optically coupled to the third waveguide.

10. The display system of claim 9, wherein the incoupling diffractive optical element is disposed at a first lateral position and the first lateral position and the second lateral position are a same lateral position.

11. An eyepiece unit comprising:
a waveguide layer disposed in a lateral plane and including an incident light surface and an opposing surface opposite the incident light surface;
a first incoupling diffractive optical element disposed on the incident light surface, wherein the first incoupling diffractive optical element is configured to:
incouple a first portion of a beam of light propagating in a first direction and to propagate the first portion of the beam of light by total internal reflection in a second direction; and
transmit a second portion of the beam of light along the first direction;
a second incoupling diffractive optical element disposed on the opposing surface, wherein the second incoupling diffractive optical element is configured to:
receive the second portion of the beam of light along the first direction;
incouple a third portion of the beam of light and to propagate the third portion of the beam of light by total internal reflection in a third direction; and
transmit a fourth portion of the beam of light along the first direction; and
a retroreflector disposed adjacent the opposing surface, wherein the retroreflector is configured to retroreflect the fourth portion of the beam of light along a reflected direction opposite to the first direction.

12. The eyepiece unit of claim 11, wherein the second incoupling diffractive optical element comprises a metallized retroreflector.

13. The eyepiece unit of claim 11, wherein the first incoupling diffractive optical element is configured to incouple light in a first spectral band.

14. The eyepiece unit of claim 13 wherein:
the second incoupling diffractive optical element is configured to incouple light in a second spectral band;
the first spectral band includes red wavelengths; and
the second spectral band includes green wavelengths.

15. A method of operating a display system, the method comprising:
directing a beam of light in a first direction;
receiving the beam of light at an incident light surface of a waveguide layer having an opposing surface opposite the incident light surface;
propagating, at a first diffractive optical element, a first portion of the beam of light into the waveguide layer in a second direction;
transmitting, at the first diffractive optical element, a second portion of the beam of light toward the opposing surface; and
retroreflecting the second portion of the beam of light along a reflected direction opposite to the first direction.

16. The method of claim 15 further comprising:
propagating, at the first diffractive optical element, a first fraction of the second portion of the beam of light into the waveguide layer in the second direction; and
transmitting, at the first diffractive optical element, a second fraction of the second portion of the beam of light along the reflected direction.

17. The method of claim 16 further comprising:
reflecting at least a portion of the second fraction in the first direction toward the waveguide layer;
receiving the reflected portion at the incident light surface of the waveguide layer; and
propagating, at the first diffractive optical element, a portion of the reflected portion into the waveguide layer in the second direction.

18. The method of claim 15 wherein the first diffractive optical element is disposed on the incident light surface.

19. The method of claim 15 wherein retroreflecting the second portion of the beam of light comprises retroreflecting light along a reflected direction opposite to the first direction.

20. The method of claim 15 wherein directing the beam of light in the first direction comprises reflecting a time sequential color beam from a display element.

* * * * *